United States Patent [19]

Newman et al.

[11] Patent Number: 4,586,854

[45] Date of Patent: May 6, 1986

[54] VENTURI POWDER PUMP HAVING ROTATING DIFFUSER

[75] Inventors: Allen R. Newman, Lorain; Kenneth Holley, South Amherst, both of Ohio

[73] Assignee: Nordson Corporation, Amherst, Ohio

[21] Appl. No.: 744,115

[22] Filed: Jun. 12, 1985

[51] Int. Cl.[4] .................... B65G 53/14

[52] U.S. Cl. .................... 406/153; 137/888; 239/311; 239/405; 366/165; 366/280; 406/138; 406/142; 406/191

[58] Field of Search .................... 406/92-95, 406/141-144, 151-153, 114, 127, 138, 192, 52, 191, 115, 116; 366/280, 155, 165, 176; 137/888; 239/311, 403, 405, 380, 383

[56] References Cited

U.S. PATENT DOCUMENTS

| | | | |
|---|---|---|---|
| 3,030,152 | 4/1962 | Hoshino | 406/191 |
| 3,746,254 | 7/1973 | Duncan et al. . | |
| 3,870,375 | 3/1975 | Duncan et al. | 406/127 |

*Primary Examiner*—Jeffrey V. Nase

*Attorney, Agent, or Firm*—Wood, Herron & Evans

[57] ABSTRACT

An improved powder pump for pumping air entrained solid particulate powder material comprising a pneumatic conveyor line within which there is located a low pressure venturi pumping chamber. This venturi pumping chamber is intersected by a powder supply passage through which powder is drawn into the conveyor line. Located within the powder supply passage is a rotatable tubular powder diffuser through which the powder passes in the course of passage through the powder supply passage. Rotation of the diffuser is effected by atomizing or metering air flow to the powder flow passage upstream of the venturi pumping chamber. This atomizing air flow, in addition to effecting rotation of the diffuser, also controls the rate of flow of powder through the powder supply passage and into the venturi pumping chamber.

14 Claims, 4 Drawing Figures

VENTURI POWDER PUMP HAVING ROTATING DIFFUSER

This invention relates to powder pumps for pumping solid particulate powder material. More particularly, this invention relates to an improved powder pump for pumping an even flow of powder from a powder source to a powder spray gun or dispenser.

Characteristically, powder pumps comprise a pneumatic conveyor line within which there is a low pressure venturi pumping chamber. This chamber is intersected by a powder supply passage through which powder is supplied from a fluidized bed or from a hopper. In order to meter or control the rate of flow of powder from the powder source into the venturi pumping chamber, such pumps conventionally include an atomizing or metering air flow passage operable to inject a controlled flow of air into the powder supply passage. The pressure of this metering air flow controls the amount of air which is mixed with the powder entering the pump. Consequently, if the metering air flow pressure is increased, the amount of air in the powder-air mixture is increased and the net powder flow rate is decreased. Conversely, if the metering air flow pressure is decreased, the amount of air in the powder-air mixture is decreased and the net flow rate of powder is increased. A typical prior art powder flow pump of this type is disclosed and described in U.S. Pat. No. 3,746,254 of Lane S. Duncan, et al, which patent is assigned to the assignee of this application.

In the above-identified U.S. Pat. No. 3,746,254, metering air flow into the powder supply passage to the powder pump is directed radially through an annular orifice and generally perpendicular to the powder flow passage. In other prior art powder pumps the metering air flow is directed radially into the powder flow passage through radial slots in a diffuser. In either event, the pressure of the metering air flow supplied to the powder supply passage controls the rate of flow of powder into and from the pump.

One problem characteristic of prior art powder spray systems has been the difficulty of obtaining even flow of powder from the gun of the system. Instead of flowing evenly from the gun, powder commonly flowed unevenly from the gun. There were periodic puffs or clouds of powder ejected from the gun and periodic reductions in the density of powder ejected from the gun. Such periodic increases or decreases in powder density resulted in uneven application of powder to a target substrate to which the powder was applied. Consequently, such random changes in powder density were very undesirable.

Another problem characteristic of prior art powder spray systems has been periodic clogging of the nozzle of the spray gun and of the venturi pump of the system. This periodic clogging of these components of the system has apparently been attributable to poor atomization or poor dispersion of the powder within the air stream of the system.

Yet another problem characteristic of prior art powder spray systems has been that of obtaining low flow rates with such systems. In many applications it has been desirable but unobtainable to apply a fine film of powder to a target substrate.

It has therefore been an objective of this invention to provide an improved powder spray system wherein inadvertent or random changes in the flow rate of powder dispensed from a powder spray gun or dispenser of the system are minimized or eliminated.

It has been another objective of this invention to provide an improved powder spray system which is less subject to periodic clogging of the gun and venturi pump of the system.

Yet another objective of this invention has been to provide an improved powder spray system which better atomizes or disperses the powder in the air stream.

Still another objective of this invention has been to provide an improved powder spray system capable of spraying powder at very low flow rates and rates substantially below those achieved by prior art powder spray systems.

Still another objective of this invention has been to provide a powder spray system which requires less maintenance of the powder spray pump and powder spray gun than has been required to maintain prior art powder spray systems.

These objectives are achieved and this invention is in part predicated upon the discovery that one source of uneven flow of powder from a powder spray gun or dispenser of a powder spray system is the pump through which the powder is supplied to the gun. It has therefore been an objective of this invention to provide an improved powder pump for use in a powder spray system.

The improved powder pump of this invention comprises a conventional pneumatic conveyor line having a venturi pumping chamber contained therein. This pumping chamber is intersected by a powder supply passage within which there is a diffuser chamber. A rotatable diffuser is loosely fitted within this diffuser chamber of the powder flow passage. Rotation of the diffuser is effected by directing metering air flow tangentially into the diffuser chamber. This metering air flow leaves the diffuser chamber and intersects the powder flow passage via an annular port located between the diffuser and a shoulder of the air flow passage so that in addition to effecting rotation of the diffuser, it also controls the rate of flow of powder from the pump.

The primary advantage of this invention is that it effects a better atomization or even dispersion of the powder in the air flow stream of the pump, and the stream ultimately emitted from the spray gun of the system. As a consequence of this more effective powder atomization and even dispersion of powder in the air flow stream, periodic puffs or clouds of powder and periodic reductions in the density of powder ejected from the gun in the system are substantially reduced or eliminated.

Other advantages which result from the practice of this invention are reduced clogging of the venturi pump and spray gun of the system and less maintenance of the system, as well as an ability of the system to spray powder at lower flow rates than have heretofore been achievable.

These and other objects and advantages of this invention will be more readily apparent from the following description of the drawings in which.

Figure 1:
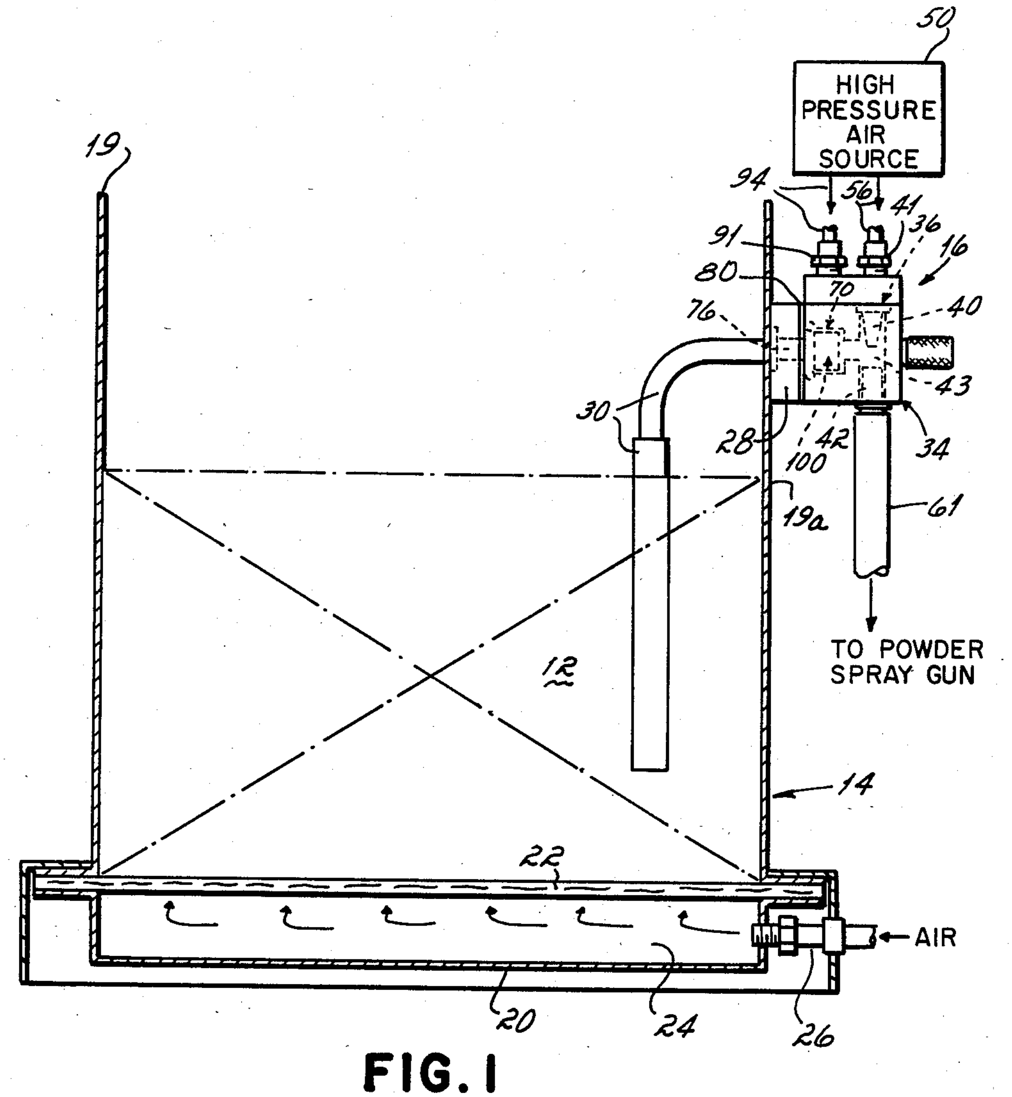
FIG. 1 is a side elevational view, partially in cross section, of a powder spray system incorporating the novel powder pump of this invention.

Referring first to FIG. 1, there is illustrated a powder spray system for transporting solid particulate powder 12 from a fluidized bed container 14 through a powder pump 16 to a powder spray gun (not shown). The fluidized bed container 14 comprises a conventional open top container having four side walls 19 and a bottom wall 20. Spaced upwardly from the bottom wall there is an air pervious wall 22 which extends between the four side walls and is secured thereto. This air pervious wall, the parallel bottom wall 20, and the side walls define an air chamber 24 into which high pressure air is introduced (typically between 5 psi–20 psi) from a source (not shown) through a side wall fitting 26. This high pressure air passes from the air chamber 24 upwardly through the pervious wall 22 to fluidize the powder 12 contained interiorly of the container 14.

The powder pump 16 is attached to one side wall 19*a* of the container by a support plate 28. A conduit or hose 30 extends downwardly from the pump into the container 14 and is operative to supply powder from the bed of fluidized powder 12 to the interior of the pump, as explained more fully hereinafter.

Figure 2:
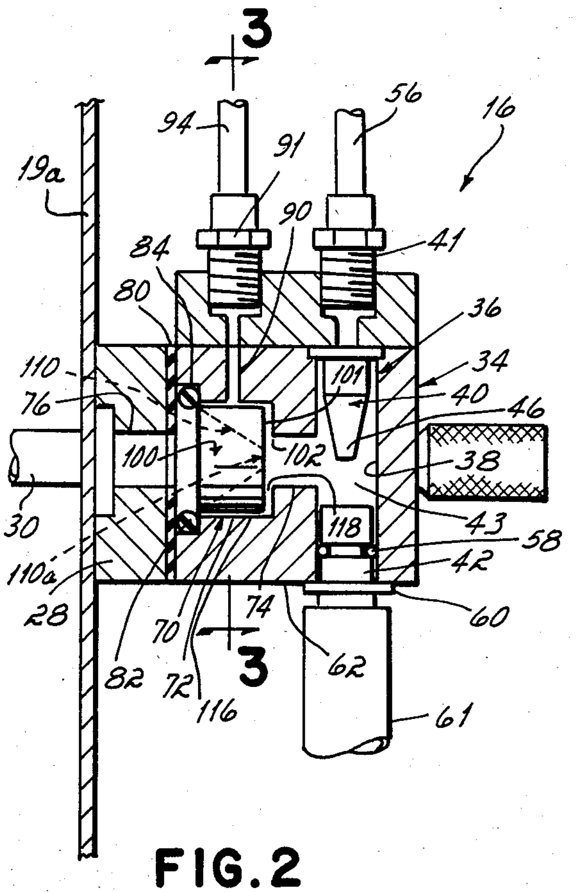
FIG. 2 is a cross-sectional view through the powder pump of FIG. 1.

With reference now to FIG. 2, it will be seen that the powder pump 16 comprises a pump body 34 through which a pneumatic conveyor line 36 extends. This conveyor line comprises a vertical bore 38 within which there is mounted an inlet fitting 41, a nozzle 40, and an outlet fitting 42. Between the nozzle 40 and outlet fitting 42, there is a low pressure venturi pumping chamber 43.

The nozzle 40 includes a conically shaped discharge end 46 located within the venturi pumping chamber 43 of the pump. The nozzle 40 has an axial bore which extends through the nozzle and terminates in a small discharge orifice through which high velocity air is supplied to the venturi pumping chamber 43. A high pressure source of air 50 is connected via a conduit 56 to the inlet fitting 41. Typically source 50 provides air to inlet 41 at between 20 psi and 80 psi.

The outlet fitting 42 is mounted in the discharge end of the vertical bore 38. It comprises a conventional hose fitting sealingly secured within the transverse bore 38. An O-ring 58 is mounted on the periphery of the fitting so as to form a seal between the fitting and the bore 38. The fitting has a flange 60 which engages an end wall 62 of the pump body 34. Outwardly of the flange, the outlet fitting has tapered annular ribs (not shown) adapted to receive a discharge hose or conduit 61 through which powder is transported from the pump to a powder spray gun, or other powder dispenser.

In practice, high pressure air from the source 50 is directed through the nozzle 40 into the venturi pumping chamber 43 and subsequently through the outlet fitting 42. In the course of passage through the pneumatic conveyor line 36, the air flow lowers the pressure within the venturi pumping chamber 43 of the pneumatic conveyor line. As explained more fully hereinafter, the low air pressure in the venturi pumping chamber 43 functions to draw powder into the chamber.

Intersecting the vertical bore 38 there is a powder flow passage 70 which extends through the pump body 34. This passage comprises a large diameter diffuser chamber section 72 and a smaller diameter inner end section 74. The side of the pump body 34 rests against the support plate 28 which in turn rests against the side wall 19*a* of the container 14. The support block 28 has a bore 76 coaxially aligned with the axis of the powder flow passage 70. The hose or conduit 30 is fitted into the bore 76 and forms a continuation of it downwardly into the fluidized powder 12.

The supporting block 28 is preferably bolted to the side of the pump body 34 by bolts (not shown). A seal or gasket 80 is sandwiched between the support block 28 and the pump body 34. Additionally, an O-ring 82 is located within an annular groove 84 formed in the bore 72 of the pump body.

The powder flow passage 70 is intersected by a metering air flow passage 90. The outer end of this passage is threaded and receives an inlet air fitting 91. High pressure air from the source 50 is supplied to the inlet air fitting 91 via a hose or conduit 94. Typically, air is supplied to fitting 31 at between 5 psi and 20 psi. Note that while for convenience fittings 41 and 91 are shown as being supplied by the same air source 50, they would be preceeded by independly adjusted regulators (not shown) to allow for different air pressures to be supplied to the fittings 41, 91. As explained more fully hereinafter, high pressure air supplied through the metering air flow passage 90 into the powder flow passage both effects rotation of a diffuser 100 located within the diffuser chamber section of the powder flow passage and controls the amount of air mixed with the powder flowing to the venturi pumping chamber of the pump. As the pressure in the line 90 is increased, the flow of powder 12 from the fluidized bed into the venturi pumping chamber 43 of the pump is decreased. Correspondingly, as the pressure in line 90 is decreased, powder flow is increased.

Located within the diffuser chamber section of the powder flow passage 70 is the powder diffuser 100. This diffuser is generally cylindrical in external configuration. It has a tapered bore which tapers inwardly from the inlet end to its discharge end.

The external diameter of the diffuser is approximately 0.003 inches smaller than the internal diameter of the diffuser chamber section of the powder flow passage 70. Consequently, it is loosely mounted therein. There is also a substantial gap or clearance between the inside radial face 101 of the diffuser and a shoulder 102 between the two different diameter sections 72, 74 of the powder flow passage 70. As a consequence, the diffuser 100 is free to float or move both axially and radially within the diffuser chamber section of the powder floor passage 70.

Figure 4:
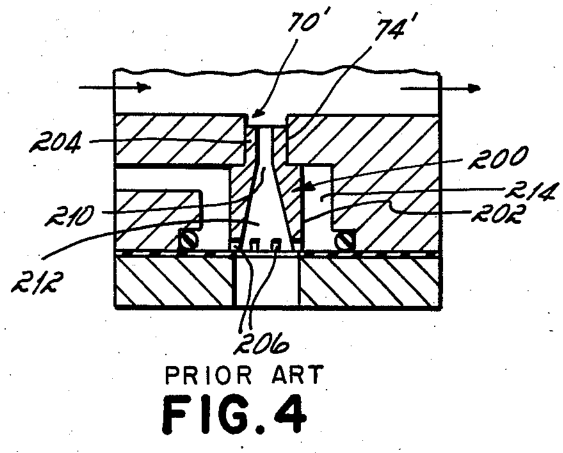
FIG. 4 is a cross-sectional view of a portion of a prior art powder pump.

The fluidized bed container 14, as well as the pump 16 heretofore described, except for the diffuser 100, is conventional and known in the prior art. With reference to FIG. 4 there is illustrated a diffuser 200 which is also known in the prior art. This diffuser has a large diameter outer end section 202 and a smaller diameter inner end section 204 received within the small diameter inner end section 74' of the powder flow passage 70'. The diffuser 200 also has an axial bore 210 extending therethrough and a tapered entrance throat 212 in this bore. The outer end of this prior art diffuser 200 has a plurality of slots 206 formed therein through which metering air from a high pressure air source may enter the throat 212 of the diffuser from an annular air chamber 214 which surrounds the diffuser. This high pressure air flows radially inwardly through the slots 206 into the powder flow bore 210 contained internally of the diffuser and is operative, depending upon the pressure of the air supplied to the diffuser 200, to control the rate of powder flow from the pump.

Figure 3:
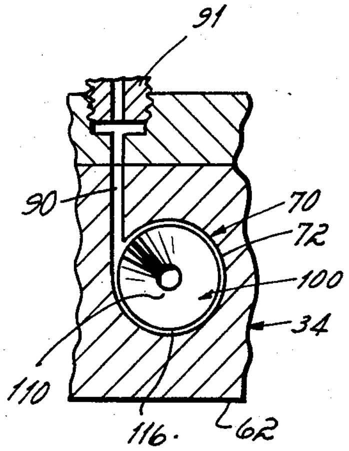
FIG. 3 is a cross-sectional view taken on line 3—3 of FIG. 2.

In operation of the pump of FIGS. 1–3, high pressure air is supplied from a high pressure air source 50 into the pneumatic conveyor line 36 via the conduit 56. This high pressure air passes through the inlet nozzle 40, out the small diameter outlet orifice 46 thereof and into the venturi pumping chamber 43 of the pneumatic conveyor line 36. From this venturi pumping chamber the air flows out of the pump via the outlet fitting 42 and a hose 61 to a powder spray gun. The low pressure created within the venturi pumping chamber results in powder being drawn from the fluidized bed of powder 12 through the diffuser 100, and powder flow passage 110 contained therein, and into the venturi pumping chamber 43. The greater the air pressure supplied to the nozzle 40, the greater is the quantity of powder 12 drawn up from the fluidized bed into the pump. The quantity of powder air mixture which is supplied to the venturi chamber of the pump is regulated by metering air flow supplied to the pump from a high pressure air source via the conduit 94 and the metering inlet air flow passage 90. This metering air flow enters the annular chamber 116 surrounding the diffuser 100 and passes through that chamber 116, through a radial gap 118 between the inner face 101 of the diffuser and shoulder 102 into the powder flow passage. This inwardly directed air enters the powder flow passage 110 of the diffuser in a radial direction relative to that passage 110 so as to shear and create turbulence in the powder being drawn into the venturi pumping chamber 43. The greater the air pressure supplied by conduit 94 to the diffuser chamber, the less the flow rate of powder drawn into the venturi pumping chamber 43 and thus, the less its flow rate of powder pumped from the conduit 61. Note that while passage 110 is shown as having an outlet orifice 110*a* which is smaller than the annular shoulder 102, the orifice 110*a* could also be the same size as shoulder 102, for example, to permit higher flow into the pump. In the presently preferred embodiment, in fact, the orifice 110*a* is the same diameter as the shoulder 102 to permit this higher flow condition.

Because the metering flow air is directed tangentially into the diffuser chamber section 72 of the powder flow passage, and because the diffuser is loosely retained in that chamber, air flow over the peripheral surface of the diffuser is operative to effect rotation of the diffuser 100 within the chamber 72. This rotation of the diffuser has the beneficial effect of creating whirling air currents internally of the diffuser, which whirling air currents contribute to better atomizing or dispersing of the powder flowing through the powder flow passage into the venturi chamber 43 of the pump. This whirling air flow internally of the diffuser also has the beneficial effect of preventing impact fusion of powder passing through the pump and thereby minimizing clogging and stoppage of powder flow within the pump. But the most beneficial result of the rotating diffuser and the primary reason for its inclusion in the pump is that it eliminates erratic flow of powder from the pump and from a powder spray gun disperser attached to the pump. Instead, this pump contributes to a very even flow of powder from the pump and from an attached spray gun. Such even flow is, of course, very desirable in order to apply an even coating of powder to a target substrate located forwardly of the discharge end of a conventional powder spray gun.

While we have described only a single preferred embodiment of our invention, persons skilled in the art will appreciate changes and modifications which may be made without departing from the spirit of our invention. Therefore, we do not intend to be limited except by the scope of the following appended claims.

Having described our invention, we claim:

1. A powder pump for pumping solid particulate powder from a source of powder, which pump comprises, a pneumatic conveyor line having an inlet end and a discharge end, said line also having a low pressure venturi pumping chamber contained therein, said discharge end of said conveyor line being adapted to be placed in fluid communication with a powder receiving means, said inlet end of said pneumatic conveyor line being adapted to be placed in fluid communication with a source of high pressure air, a powder flow passage intersecting said venturi pumping chamber, said powder flow passage having an inlet adapted to be placed in fluid communication with a source of solid particulate material, said powder flow passage including a diffuser chamber spaced from said venturi pumping chamber, an air flow diffuser rotatably mounted within said diffuser chamber, said diffuser having a diffuser passage extending therethrough through which powder passes in the course of flow from said source to said venturi pumping chamber, means including a metering air flow passage intersecting said diffuser chamber of said powder flow passage for effecting rotation of said air flow diffuser and for controlling the quantity of air mixed with said solid particulate powder in the course of passage through said powder flow passage.

2. The powder pump of claim 1 wherein said metering air flow passage has an inlet adapted to be placed in fluid communication with a source of high pressure air.

3. The powder pump of claim 2 wherein said metering air flow passage is operative to direct air flow into said diffuser chamber of said powder flow passage through at least one port angled generally tangentially to the peripheral surface of said air flow diffuser so as to effect rotation of said diffuser within said diffuser chamber.

4. The powder pump of claim 1 wherein said powder flow passage and said diffuser chamber are circular in cross-section and said diffuser has a generally cylindrical peripheral surface loosely received within said diffuser chamber.

5. The powder pump of claim 1 wherein said metering air flow passage intersects said powder flow passage within said diffuser chamber.

6. The powder pump of claim 1 wherein said diffuser passage of said diffuser has an inlet end and an outlet end, said diffuser passage being circular in cross-section and tapering inwardly from said inlet end to said outlet end.

7. The powder pump of claim 1 wherein said metering air flow passage is in fluid communication with said powder flow passage via an annular air flow port.

8. The powder pump of claim 7 wherein said diffuser passage of said diffuser has an inlet end and an outlet end, and said annular air flow port intersects said powder flow passage adjacent said outlet end of said diffuser passage of said diffuser.

9. A powder pump for pumping solid particulate powder from a source of powder, which pump comprises, a pneumatic conveyor line having an inlet end and a discharge end, said line also having a low pressure venturi pumping chamber contained therein, a powder flow passage intersecting said venturi pumping chamber, said powder flow passage having an inlet adapted to be placed in fluid communication with a source of solid particulate material, a rotatable diffuser contained within said powder flow passage, said diffuser having an axial passageway through which powder flows in the course of flow through said powder flow passage, means for effecting rotation of said diffuser, and, means for metering the flow of powder through said powder flow passage, said metering means comprising a metering air flow port intersecting said powder flow passage at a location spaced from said venturi pumping chamber and means for supplying high pressure air to said metering air flow port.

10. Powder pumping apparatus for pumping solid particulate powder from a source of powder, which apparatus comprises;

a pneumatic conveyor line having an inlet end and a discharge end, said line having a low pressure venturi pumping chamber contained therein, a powder flow passage intersecting said venturi pumping chamber, means for supplying high pressure air to said inlet end of said pneumatic conveyor line, means for supplying powder to said powder flow passage, means for drawing said powder through said powder flow passage into said venturi pumping chamber of said pump, a metering air flow port intersecting said powder flow passage at a location upstream from said venturi pumping chamber, means for supplying high pressure air to said metering air flow port, a diffuser located within said powder flow passage, said diffuser having an interior wall, and means for rotating said interior wall of said powder flow diffuser so as to better and more evenly distribute powder in an air stream of powder dispensed from said discharge end of said conveyor line.

11. The apparatus of claim 10 wherein said means for rotating said interior wall of said diffuser comprises high pressure air acting upon the exterior surface of said diffuser.

12. The method of pumping solid particulate powder from a source of powder, which method comprises, supplying high pressure air to a pneumatic conveyor line having an inlet end and a discharge end, said line having a low pressure venturi pumping chamber contained therein, providing powder to a powder flow passage which intersects said venturi pumping chamber, drawing said powder through said powder flow passage into said venturi pumping chamber of said pump, supplying high pressure air to a metering air flow passage which intersects said powder flow passage at a location upstream from said venturi pumping chamber, and rotating an interior wall of a diffuser located within said powder flow passage immediately adjacent the intersection of said metering air flow passage and said powder flow passage so as to better and more evenly distribute powder in an air stream of powder dispensed from said discharge end of said conveyor.

13. The method of claim 12 wherein said rotation of said interior wall is effected by high presure air.

14. The method of claim 12 wherein said rotation of said interior wall is effected by high pressure air from said metering air flow passage.

* * * * *